United States Patent
Mochida et al.

(10) Patent No.: US 8,091,014 B2
(45) Date of Patent: Jan. 3, 2012

(54) ELECTRONIC APPARATUS IN WHICH FUNCTIONING OF A MICROCOMPUTER IS MONITORED BY ANOTHER MICROCOMPUTER TO DETECT ABNORMAL OPERATION

(75) Inventors: Kentaro Mochida, Chiryu (JP); Takahito Nishii, Nagoya (JP); Yasuhiko Satoh, Kariya (JP); Masayuki Usami, Nagoya (JP); Atsushi Kawakubo, Toyota (JP)

(73) Assignees: Denso Corporation, Kariya (JP); Toyota Jidosha Kabushiki Kaisha, Toyota-shi (JP)

(*) Notice: Subject to any disclaimer, the term of this patent is extended or adjusted under 35 U.S.C. 154(b) by 805 days.

(21) Appl. No.: 12/229,188

(22) Filed: Aug. 20, 2008

(65) Prior Publication Data
US 2009/0055685 A1  Feb. 26, 2009

(30) Foreign Application Priority Data
Aug. 22, 2007  (JP) ................. 2007-216157

(51) Int. Cl.
*G06F 11/00* (2006.01)
(52) U.S. Cl. ............... 714/819; 714/47.1
(58) Field of Classification Search .......... 714/819, 714/821, 719, 712, 47.1, 45, 25
See application file for complete search history.

(56) References Cited

U.S. PATENT DOCUMENTS

| | | | |
|---|---|---|---|
| 5,897,596 A | 4/1999 | Kabune et al. | |
| 6,230,084 B1 | 5/2001 | Kijima et al. | |
| 6,704,933 B1 | 3/2004 | Tanaka | |
| 6,832,337 B2 | 12/2004 | Kidokoro et al. | |
| 7,092,803 B2 | 8/2006 | Kapolka et al. | |
| 7,110,917 B2 | 9/2006 | Matsuura et al. | |
| 7,203,431 B2 | 4/2007 | Shoji et al. | |
| 7,305,587 B2 * | 12/2007 | Kabune et al. | 714/30 |
| 7,774,690 B2 * | 8/2010 | Ogawa | 714/801 |
| 2005/0038581 A1 | 2/2005 | Kapolka et al. | |
| 2005/0060070 A1 | 3/2005 | Kapolka et al. | |
| 2005/0065678 A1 | 3/2005 | Smith et al. | |
| 2005/0085963 A1 | 4/2005 | Kapolka et al. | |

(Continued)

FOREIGN PATENT DOCUMENTS
DE  44 46 314  6/1996
(Continued)

OTHER PUBLICATIONS

Extended European Search Report dated Jun. 10, 2010 in corresponding EP Application No. 08014453.

(Continued)

*Primary Examiner* — Dieu-Minh Le
(74) *Attorney, Agent, or Firm* — Harness, Dickey & Pierce, PLC

(57) ABSTRACT

In an electronic apparatus, a first microcomputer is monitored by a second microcomputer, which periodically transmits data relating to a main function to the first microcomputer to be processed. The first microcomputer periodically updates a variable value, performs a predetermined calculation operation whose final result should be a specific fixed value, adds that final result to the updated variable value to obtain a sum value, and transmits the sum value and updated variable value concurrently to the second microcomputer. The second microcomputer determines that the first microcomputer is operating abnormally if the difference between the received sum value and variable value is not equal to the specific fixed value.

7 Claims, 11 Drawing Sheets

U.S. PATENT DOCUMENTS

| | | |
|---|---|---|
| 2005/0203646 A1 | 9/2005 | Makino et al. |
| 2005/0203673 A1 | 9/2005 | El-Hajj et al. |
| 2007/0127934 A1 | 6/2007 | Shoji et al. |

FOREIGN PATENT DOCUMENTS

| | | |
|---|---|---|
| EP | 0 322 141 | 6/1989 |
| JP | 59-58560 | 4/1984 |
| JP | 02-138642 | 5/1990 |
| JP | 06-297983 | 10/1994 |
| JP | 09-123894 | 5/1997 |
| JP | 10-185189 | 7/1998 |
| JP | 10-196949 | 7/1998 |
| JP | 2000-293365 | 10/2000 |
| JP | 2001-312315 | 11/2001 |
| JP | 2002-92214 | 3/2002 |
| JP | 2003-097344 | 4/2003 |
| JP | 2004-259137 | 9/2004 |
| JP | 2005-255037 | 9/2005 |
| JP | 2005-258384 | 9/2005 |
| JP | 2005-520725 | 9/2005 |
| JP | 2007-293524 | 11/2007 |

OTHER PUBLICATIONS

Office action dated Aug. 4, 2009 in corresponding Japanese Application No. 2007-216157.

* cited by examiner

ELECTRONIC APPARATUS IN WHICH FUNCTIONING OF A MICROCOMPUTER IS MONITORED BY ANOTHER MICROCOMPUTER TO DETECT ABNORMAL OPERATION

CROSS-REFERENCE TO RELATED APPLICATIONS

This application is based on and incorporates herein by reference Japanese Patent Application No. 2007-216157 filed on Aug. 22, 2007.

BACKGROUND OF THE INVENTION

1. Field of Application

The present invention relates to an electronic apparatus incorporating microcomputers, in which one of the microcomputers monitors the operation of another one.

2. Description of Related Art

A type of electronic apparatus which incorporates a microcomputer is known, in which a peripheral apparatus of the microcomputer monitors the functioning of the microcomputer, to detect any abnormal operation, as described for example in Japanese patent publication No. 2001-312315. In addition, a type of electronic apparatus which incorporates a plurality of microcomputer is known, in which the functioning of one of the microcomputers is monitored by another microcomputer to detect any abnormal operation. An example of such an electronic apparatus is the image processing apparatus 100 shown in diagram (a) of FIG. 9.

Abnormal operation of a microcomputer may result from one or more of the bits constituting a register in the microcomputer (such as an accumulator or a general-purpose register) become "stuck", i.e., fixed in the binary 1 or 0 state. This prevents calculation operations from being performed normally. Such a malfunction can be detected as illustrated in diagram (b) of FIG. 9. This is a known method whereby the value C of a variable is transmitted from the monitoring microcomputer to the monitored microcomputer, and the monitored microcomputer uses that value C in executing a test calculation.

To detect any stuck bit(s) in a register of the main microcomputer, the test calculation is predetermined such that different bit patterns will become successively set into the respective registers, and such that each bit of each register will change between the 1 and 0 binary states in the calculations if there are no stuck bits. The final result obtained from the test calculation, designated in the following as the calculation result X, is then added to the variable value C which was sent from the main microcomputer, to obtain a sum value Y (=C+X). The sum value Y is then transmitted from the monitored microcomputer to the monitoring microcomputer. In the following, the monitoring microcomputer will be referred to as the main microcomputer, and the monitored microcomputer as the secondary microcomputer.

To perform such a test calculation, the final result X is always obtained by the same calculation procedure, so that so long as there is no malfunction of any of the registers in the secondary microcomputer, an identical predetermined fixed value will always be obtained for the X. That predetermined fixed value is designated as X0 in the following. However if any of the registers has one or more bits stuck in the 1 or 0 state, the test calculation cannot be executed properly, so that an incorrect value will be obtained as the calculation result X.

If such a malfunction condition exists in a plurality of locations in the secondary microcomputer, then it is possible that X0 may be obtained as the calculation result X, in spite of the abnormal operation. It is for that reason that the variable value C is added to the calculation result X. The operations performed by the secondary microcomputer for obtaining a calculation result X and adding that to a variable value C, to obtain a sum value Y, will be collectively referred to as a "homework calculation" in the following description, i.e., with the sum value Y being the homework calculation result.

Respectively different values of the variable C are successively transmitted from the main microcomputer to the secondary microcomputer. Each time this occurs, the secondary microcomputer performs a homework calculation as described above, using the received value of C, then transmits the homework calculation result Y back to the main microcomputer. The main microcomputer then subtracts the corresponding value of C (i.e., most recently transmitted value of C) from the value obtained for Y. The result of the subtraction is then compared with the correct calculation result value X0.

Hence, the main microcomputer can judge whether or not the main microcomputer is functioning normally, based on whether or not the correct calculation result X0 is obtained from each of a successive predetermined plurality of such subtraction operations.

Types of electronic apparatus are known which incorporate a plurality of microcomputers, in which a main function that is executed by the apparatus is performed by cooperation between the microcomputers, through exchange of data (calculation results, etc.) between them. For example in the field of motor vehicle control, there is a type of driver assistance system known as a lane-keeping assistance (LKA) system which can control a vehicle to follow a specific traffic lane that is defined on a road. Such a system may be of the basic form illustrated in diagram (a) of FIG. 9, which incorporates the plurality of microcomputers microcomputer 101 and 103. The microcomputer 101 acquires image data from a digital video camera 105, and performs processing such as edge detection processing on the image data. The microcomputer 103 operates on detection results obtained by the microcomputer 101, to perform processing for recognition of lane markers (e.g., white lines on the road surface), etc. The image processing apparatus 100 thereby derives road parameters for the road along which the vehicle is currently travelling, i.e., parameters expressing the form of the road, etc.

In the image processing apparatus 100, the edge detection results obtained from the image processing apparatus 10 (which is connected to the camera 105), i.e., information indicating detected edge positions, are transmitted to the microcomputer 103. The microcomputer 103 thereby derives road parameters, and transmits these to the microcomputer 101. The road parameters are transmitted from the microcomputer 101 to a ECU 110, which is externally connected to the microcomputer 101, and the ECU 110 uses the obtained road parameters in performing control of the vehicle.

When the image processing apparatus 100 is configured such that the procedure described above is used for monitoring the operation of the microcomputer 103, then together with periodically performing processing for executing the main function of the microcomputer 101, the microcomputer 101 also periodically transmits successive values of the variable C to the 103. After the microcomputer 103 performs a homework calculation, it is necessary for the corresponding homework calculation result Y to be received by the microcomputer 101.

However if the data communication that is performed relating to the main function and the data communication for monitoring the operation of the microcomputer 103 are executed respectively independently, then complex processing is required for controlling the communication between the microcomputer 101 and the microcomputer 103, so that it is difficult to achieve stable control of the operation of the apparatus.

As has been previously envisaged by the assignees of the present invention, it would be possible to execute data communication between the microcomputer 101 and microcomputer 103 for monitoring the operation of the microcomputer 103 concurrently with data communication relating to the main function. If the image processing apparatus could be configured to perform such concurrent data communication, then processing relating to such communication could be simplified and stable operation of the apparatus could be ensured. For example, if such a method were to be applied for monitoring the operation of the microcomputer 103, the processing executed by the microcomputer 101 and the microcomputer 103 might be as shown in the timing diagram example of FIG. 10.

In this case, the microcomputer 101 acquires data constituting a specific number of lines of image data (horizontal scan lines of a video signal frame) in each of successive intervals that are synchronized with the vertical synchronizing signal of the video signal from the camera 105, with the acquired amount of image data as being predetermined as the amount required for processing to detect white lines (i.e., lane markers) formed on a road surface. The microcomputer 101 performs edge detection processing on each set of image data thus acquired. The information constituting the edge detection results is then transmitted by the microcomputer 101 to the microcomputer 103. Concurrent with this transmission of edge detection results, a count value N which is updated each time a new set of image data are acquired (with N being obtained from a counter which performs up-counting) is transmitted from the microcomputer 101 to the microcomputer 103, to constitute the variable value C, which is required for the homework calculation as described above.

The microcomputer 103 uses the inputted edge information to perform white-line recognition processing, i.e., calculation processing for obtaining road parameters. Before or after this is done, the microcomputer 103 performs a homework calculation using the variable value C most recently transmitted from the microcomputer 101. When the homework calculation result (sum value Y) and road parameters have been derived, the microcomputer 103 transmits these concurrently (i.e., in immediate succession) to the microcomputer 101.

As well as performing image data acquisition and edge detection operations, the microcomputer 101 performs judgement processing for detecting abnormal operation of the microcomputer 103, based on the received sum values Y. The most recently attained count value N is subtracted from the currently received sum value Y, to obtain a subtraction result Z, and a decision is then made as to whether or not the subtraction result Z is correct.

With this example, the variable value C is updated (i.e., counter N is incremented) each time the current value of C has been transmitted to the microcomputer 103. Hence as can be understood from the timing diagram of FIG. 10, each time the microcomputer 101 processes a homework calculation result Y which has been transmitted from the microcomputer 103, the current value of C will already have been incremented by 2 relative to the value of C which was used in executing that homework calculation. That is to say, in performing the abnormality judgement, the microcomputer 101 operates on a homework calculation result (sum value Y) which is based on a variable value C that was transmitted from the microcomputer 101 to the microcomputer 103 two cycles previously.

Thus if the microcomputer 103 is operating normally, the subtraction value Z that is obtained by subtracting the current count value N (i.e., current value of C) from the most recently received homework calculation result Y will be equal to (X0−2), where X0 is the correct value of Y.

Thus, to perform the abnormality judgement, the microcomputer 101 judges whether the subtraction value Z is equal to the correct value (X0−2), each time a new homework calculation result Y is received from the microcomputer 103. If it is found that an incorrect result is obtained for Z a predetermined plurality of times in succession, then the microcomputer 101 transmits diagnostics information indicative of abnormality of the microcomputer 103, to the external ECU 110. Otherwise, the microcomputer 101 transmits diagnostics information indicating that the microcomputer 103 is functioning normally, to the ECU 110.

However with such a method, the following problem arises. The transmissions of the variable value C to the microcomputer 103 are synchronized with the processing operations of the microcomputer 101, i.e., occur at the start of each frame period of the video signal. However the transmissions of the homework calculation result Y together with road parameters, from the microcomputer 103 to the microcomputer 101, cannot be so synchronized. If the microcomputer 103 requires a substantial amount of time to perform whiteline recognition processing, it may not be possible for the currently obtained homework calculation result Y (i.e., calculated using a specific value of C) to be transmitted to the microcomputer 101 during the same cycle in which that value of C was transmitted from the microcomputer 101. (where the term "cycles", with this example, refers to the intervals between successive vertical synchronizing signal of the camera). This will prevent the microcomputer 101 from performing abnormality judgement correctly.

The reasons for this can be readily understood by referring to the timing diagram example of FIG. 11.

With the image processing apparatus 100 of FIG. 9, the microcomputer 101 performs processing for receiving the road parameters and the homework calculation result Y in parallel with executing its main function. That is to say, in parallel with executing the operations constituting its main function, each time that data are transmitted from the microcomputer 103, the microcomputer 101 writes the received road parameters and homework calculation result Y (received via a serial interface) into a receiving buffer. This is a region reserved in an internal RAM of the microcomputer 101. Thereafter, immediately before the next transmission of edge detection information to the microcomputer 103, the ECU 110 transfers the data that had been most recently written into the receiving buffer into a separate region in RAM, i.e., a working memory region. The homework calculation result Y and is then used by the microcomputer 101 to judge whether the microcomputer 103 is operating normally, and the road parameters are transmitted to the ECU 110.

Hence with such a type of image processing apparatus 100, if the microcomputer 101 has not received updated homework calculation result and road parameter data from the microcomputer 103 during the preceding cycle (preceding frame period), but receives them during the current cycle (as illustrated for the third frame period in FIG. 11, when the counter N is 14), the homework calculation result Y from two cycles previously will be read out from the receiving buffer and utilized in the abnormality judgement.

Since the current value of N is not applicable to that homework calculation result, it will be judged (incorrectly) that abnormal operation of the 103x is occurring.

That is to say, the value which is subtracted from the homework calculation result Y will have been increased from the correct value by 1, so that even if the microcomputer 103 is operating normally, the subtraction result Z will be obtained as (X0−3) and hence will not match the correct subtraction result of (X0−2).

Furthermore, (referring again to the third period in FIG. 11, when the value of N is 14), in such a case, after the delayed homework calculation result Y and road parameters have been written into the receiving buffer of the microcomputer 101, that value of Y will then be used in the abnormality judgement operation in the succeeding cycle (when N is 15). That abnormality judgement will use an inappropriate count value C (i.e., 15). Thus in such a case too, due to the effects of the delay in transmitting the data from the microcomputer 103, the microcomputer 101 will again find that the subtraction result Z does not match the correct value of (X0−2), and so will incorrectly judge that the microcomputer 103 is functioning abnormally, even if it is actually operating normally.

This condition of incorrect abnormality judgement will continue so long as the transmission delay condition of the microcomputer 103 continues, as illustrated in FIG. 11.

It can thus be understood that with such a method, in which a count value N is transmitted as the variable value C from the microcomputer 101 to the microcomputer 103, and the microcomputer 103 derives the homework calculation result Y based on that count value N, if there is a delay in the processing executed by the microcomputer 103 to the extent that a homework calculation result Y cannot be transmitted by the microcomputer 103 to the microcomputer 101 within the appropriate cycle, then the microcomputer 101 will use an incorrect count value when performing the abnormality judgement. The subtraction result Z thus will not match the correct value of (X0−2), and when this condition occurs more than a predetermined plurality of times in succession, the microcomputer 101 will (incorrectly) judge that the microcomputer 103 is not functioning normally, and will send diagnostics information indicative of this incorrect judgement to the ECU 110.

Thus, even if the microcomputer 101 is configured to judge that abnormal operation of the microcomputer 103 is occurring only under the condition that an incorrect value for the subtraction result Z is obtained a specific number of times in succession, this condition may arise even if the microcomputer 103 is functioning normally. This is due to the fact that when the microcomputer 103 is performing processing such as white line recognition processing, and this causes a delay in transmitting a homework calculation result Y to the microcomputer 101, such a delay may occur for each of a plurality of successively obtained values of Y. Hence in such a case, the microcomputer 101 will incorrectly diagnose that the microcomputer 103 is not operating normally.

If the microcomputer 101 were configured to manage the information that determines the variable value C which will be used in each abnormality judgement, such as to ensure that the appropriate value of C will be applied in executing each abnormality judgement, such a problem could be avoided.

However in such a case it would be necessary for the main microcomputer to detect any delay in transmission by the secondary microcomputer, and to take account of the transmission delay in determining the appropriate corresponding variable value C to be used in performing an abnormality judgement. This will involve complex processing.

Furthermore in addition to the transmission delays, another problem exists, in that the secondary microcomputer may sometimes fail to receive a variable value C that is transmitted from the main microcomputer. For example if the secondary microcomputer is busy in performing processing relating to its main function when a variable value C is transmitted from the main microcomputer, then the secondary microcomputer will not receive that updated value of C, and so will not use it when performing the next homework calculation processing. This "reception failure" condition is illustrated in the second and fourth cycles in the example of FIG. 11. It would be necessary for the main microcomputer to recognize when such a reception failure occurs, in order to use the appropriate values of the variable C in judging the homework calculation results. Otherwise, reliable judgement as to abnormal operation of the secondary microcomputer would not be possible.

SUMMARY OF THE INVENTION

It is an objective of the present invention to overcome the above problems, by providing an electronic apparatus incorporating a microcomputer whose operation is monitored by another microcomputer in the electronic apparatus, wherein the monitoring microcomputer will reliably judge an occurrence of abnormal operation of the monitored microcomputer, with the judgement being unaffected by delays in processing that is performed by the monitored microcomputer.

To achieve the above objective, according to a first aspect, the invention provides an electronic control apparatus incorporating a first microcomputer and a second microcomputer which are connected for data communication with one another, wherein the microcomputers respectively execute the following processing.

The first microcomputer repetitively performs an operation in which it:

sets predetermined bit patterns in each of the registers of the CPU core of that microcomputer and executes a predetermined calculation whereby a result value from the calculation will be a specific constant value if the registers are functioning normally (this being referred to in the following as the No. 1 homework calculation procedure);

adds this calculation result value to a value which has been established for a variable in a No. 2 homework calculation procedure, with the variable value being updated each time such an addition operation is performed (with the term "variable value" being used herein to signify a specific value assigned to a variable) and transmits information expressing the sum value that is obtained from the addition operation and information expressing the specific variable value which was used in that addition operation, to the second microcomputer (this being referred to as the transmission procedure).

Each time that information expressing such a combination of a sum value and variable value is received by the second microcomputer, it subtracts that variable value from the sum value, to obtain a subtraction value (this being referred to as the subtraction procedure). The second microcomputer then judges whether or not the subtraction value is identical to a predetermined correct (normal) value (this being referred to as the judgement procedure). Based on results obtained from the judgement procedure, the second microcomputer judges whether abnormal operation of the first microcomputer is occurring, and if so, transmits information indicative of this abnormal operation to external equipment.

Thus with the present invention, a monitored microcomputer (first microcomputer) determines the variable value C that is to be used in a homework calculation, executes the homework calculation processing to obtain a result value Y, and transmits information expressing the homework calculation result value Y (sum value Y) and the variable value C which was used in that execution of the homework calculation to the monitoring microcomputer (second microcomputer).

Thus with such an electronic control apparatus, the monitoring microcomputer can detect abnormal operation of the monitored microcomputer without requiring to send values of the variable C to the monitored microcomputer.

Furthermore with the present invention, the monitoring microcomputer can reliably detect abnormal operation of the monitored microcomputer, irrespective of effects of processing delays that may occur with the monitored microcomputer. That is to say, the monitoring microcomputer will subtract the correct variable value C from a received homework calculation result Y, without requiring the monitoring microcomputer to manage the variable value C such as to take into account the effects of processing delays (more specifically, data transmission delays which result from processing delays) of the monitored microcomputer. Thus, erroneous diagnosis of abnormal operation of the monitoring microcomputer (i.e., erroneous diagnosis resulting from data transmission delays by the monitored microcomputer) can be prevented, without requiring complex control processing to be executed by the monitoring microcomputer for the purpose of preventing such erroneous diagnosis.

The invention is particularly applicable to an electronic apparatus in which a plurality of microcomputers cooperate to periodically exchange data, for performing a main function of the electronic apparatus. When the invention is applied to such a type of electronic apparatus, the above-described abnormal operation judgement function can be implemented periodically, combined with processing relating to the main function.

That is to say, the monitored microcomputer can periodically execute a processing sequence made up of first and second homework calculation procedures and a transmission procedure (for transmitting data to the monitoring microcomputer), while the monitoring microcomputer periodically executes a processing sequence made up of a subtraction procedure and a judgement procedure. In that way, the monitoring microcomputer can continuously monitor the monitored microcomputer, to immediately detect any occurrence of abnormal operation.

With such a system, the monitored microcomputer is preferably configured such that it periodically transmits data for use in executing the main function to the monitoring microcomputer together with information expressing a homework calculation result and the variable value corresponding to that calculation. By thus configuring the monitored microcomputer to transmit data relating to the main function together with (i.e., substantially concurrent with) transmitting data relating to monitoring for detection of abnormal operation, data communication between the microcomputers can be effected in a simple manner, while performing frequent data communication operations between them. Instability of the electronic apparatus can thereby be prevented.

Figure 4:
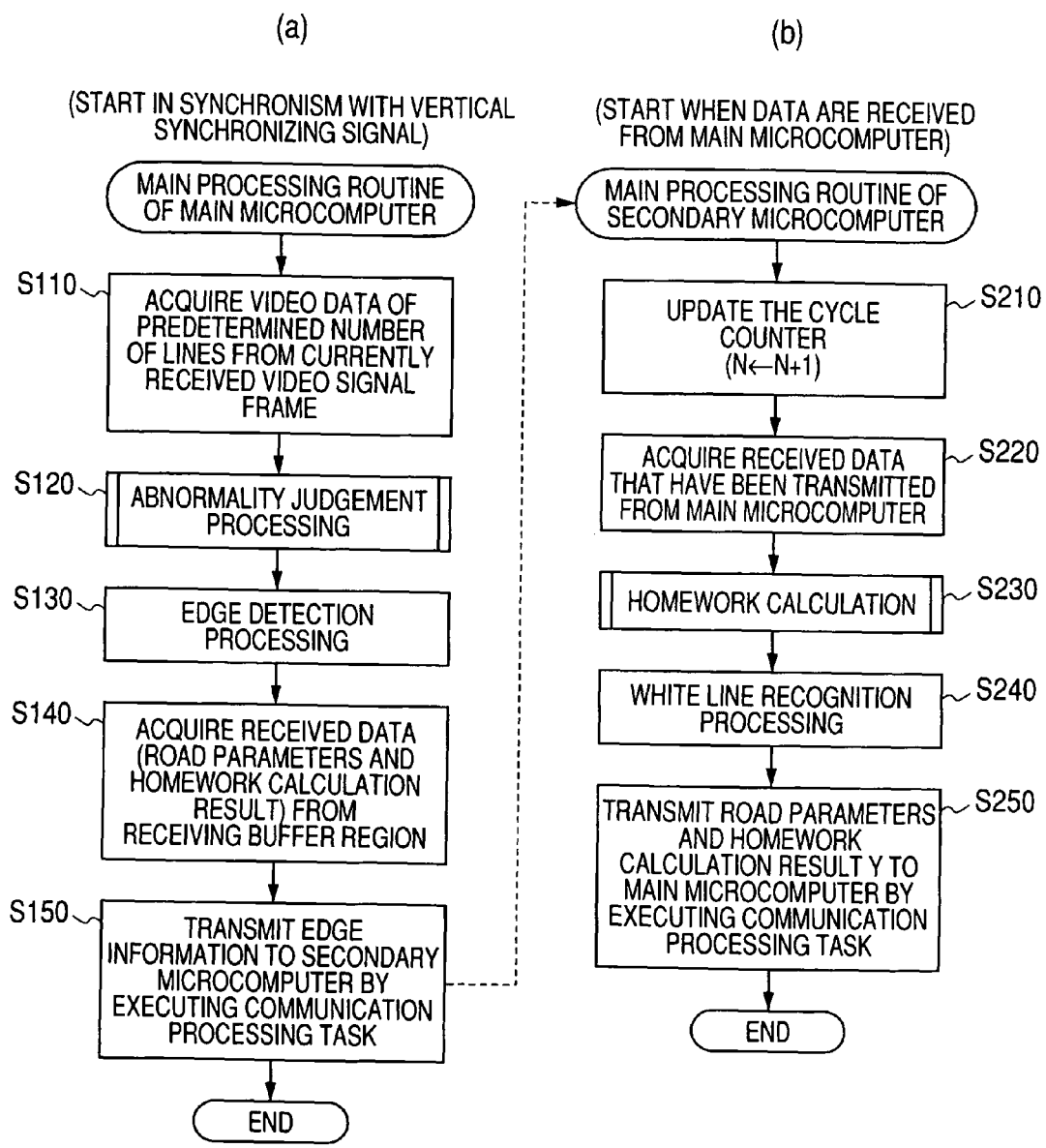
Figure 5:
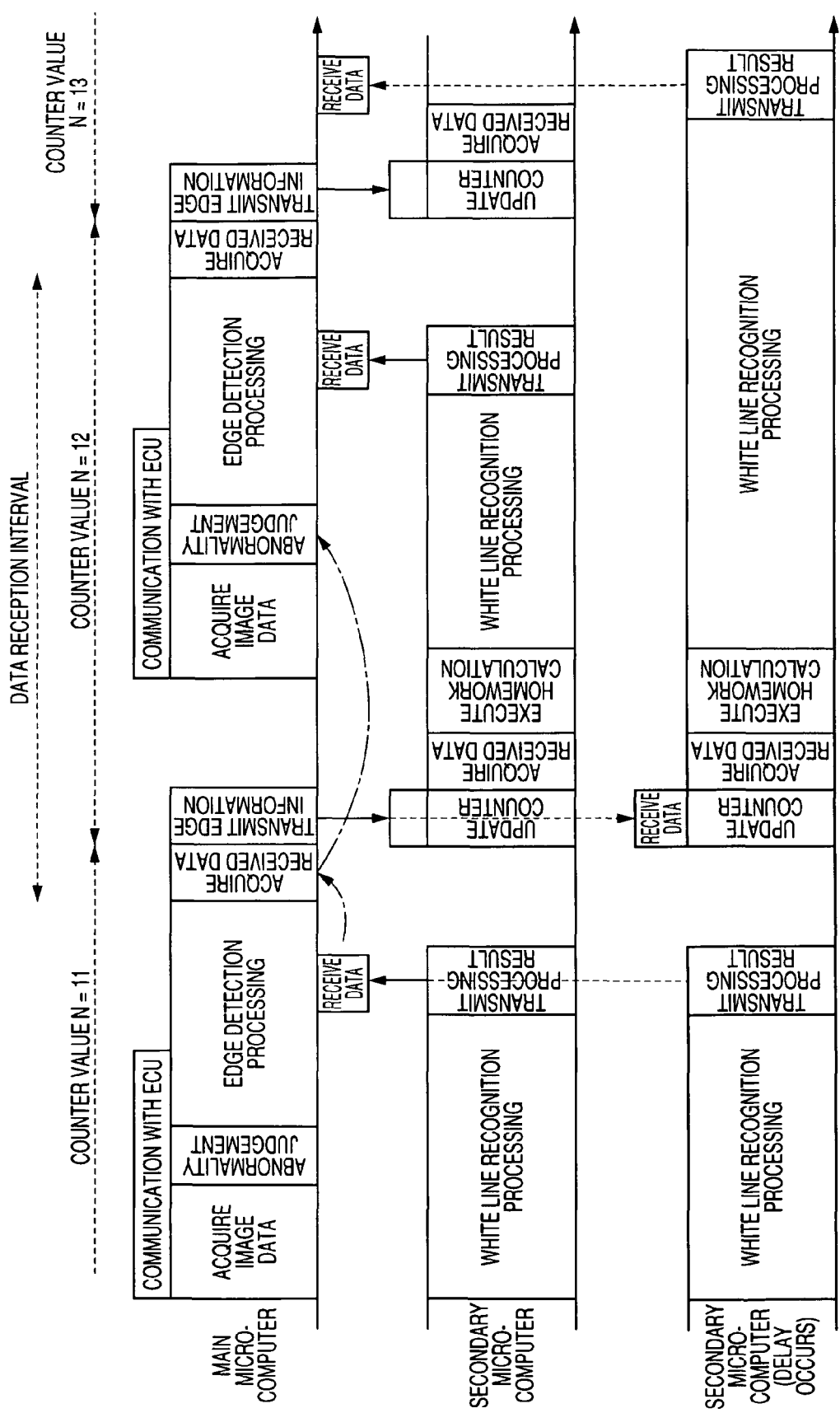
Figure 6:
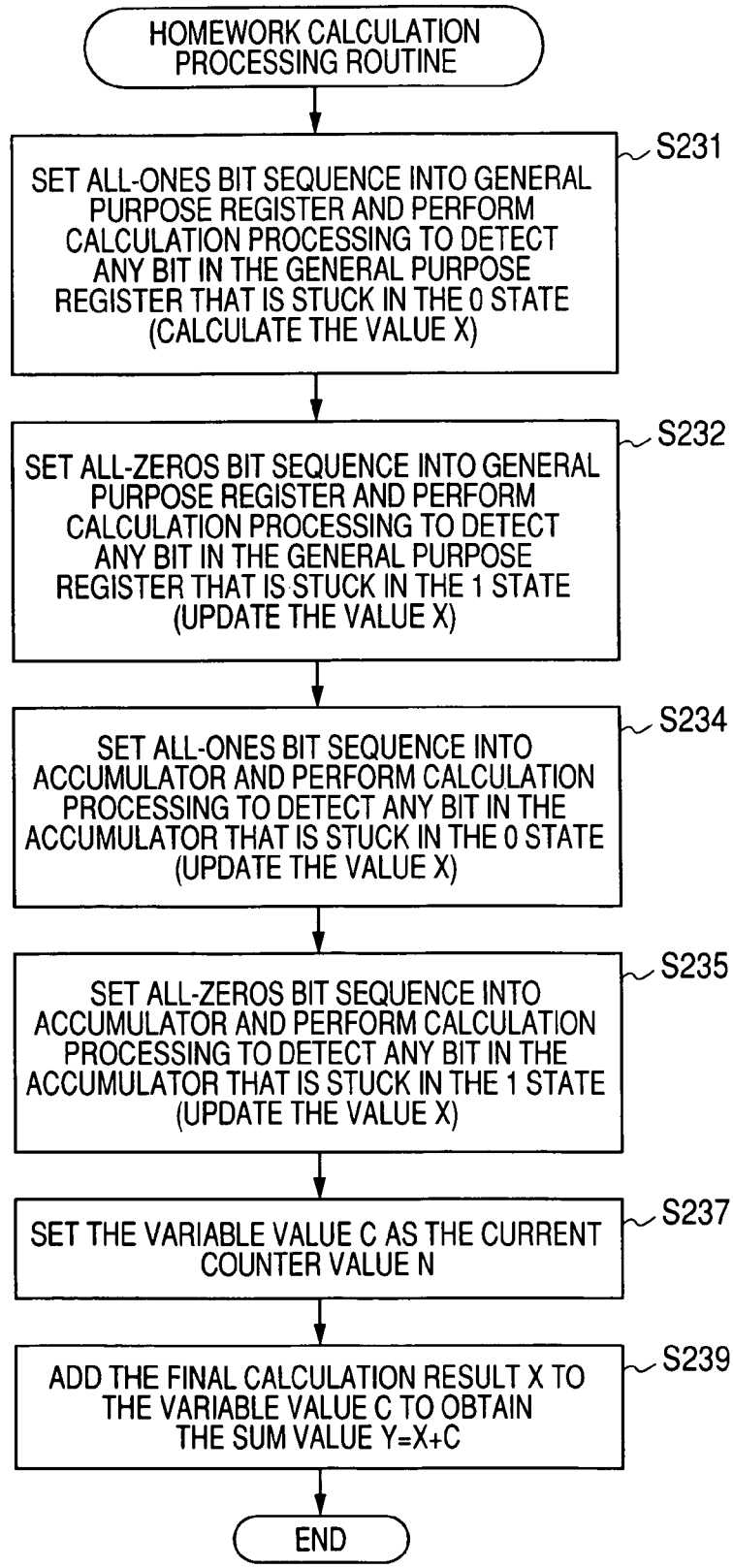
Figure 7:
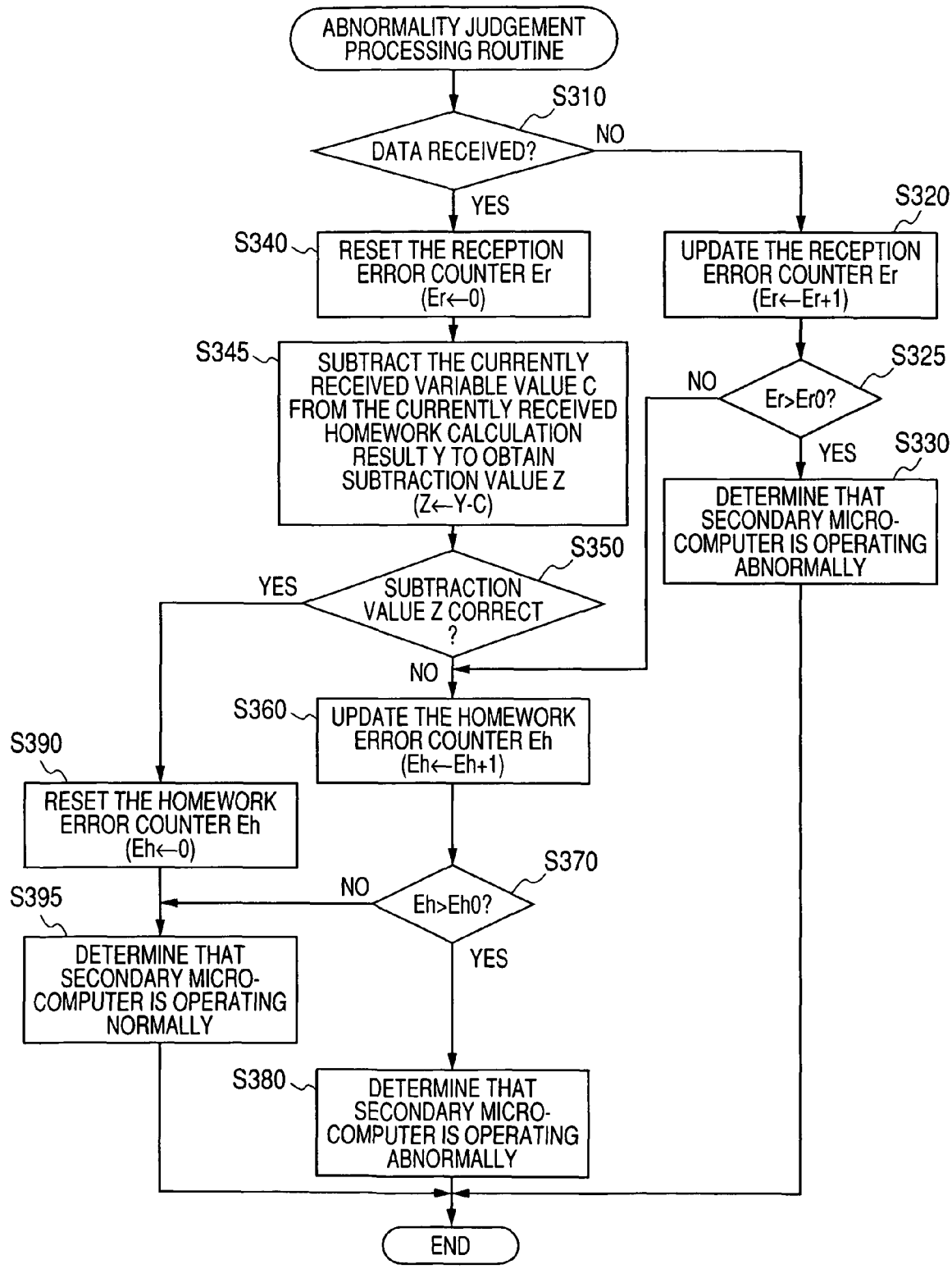
Figure 8:
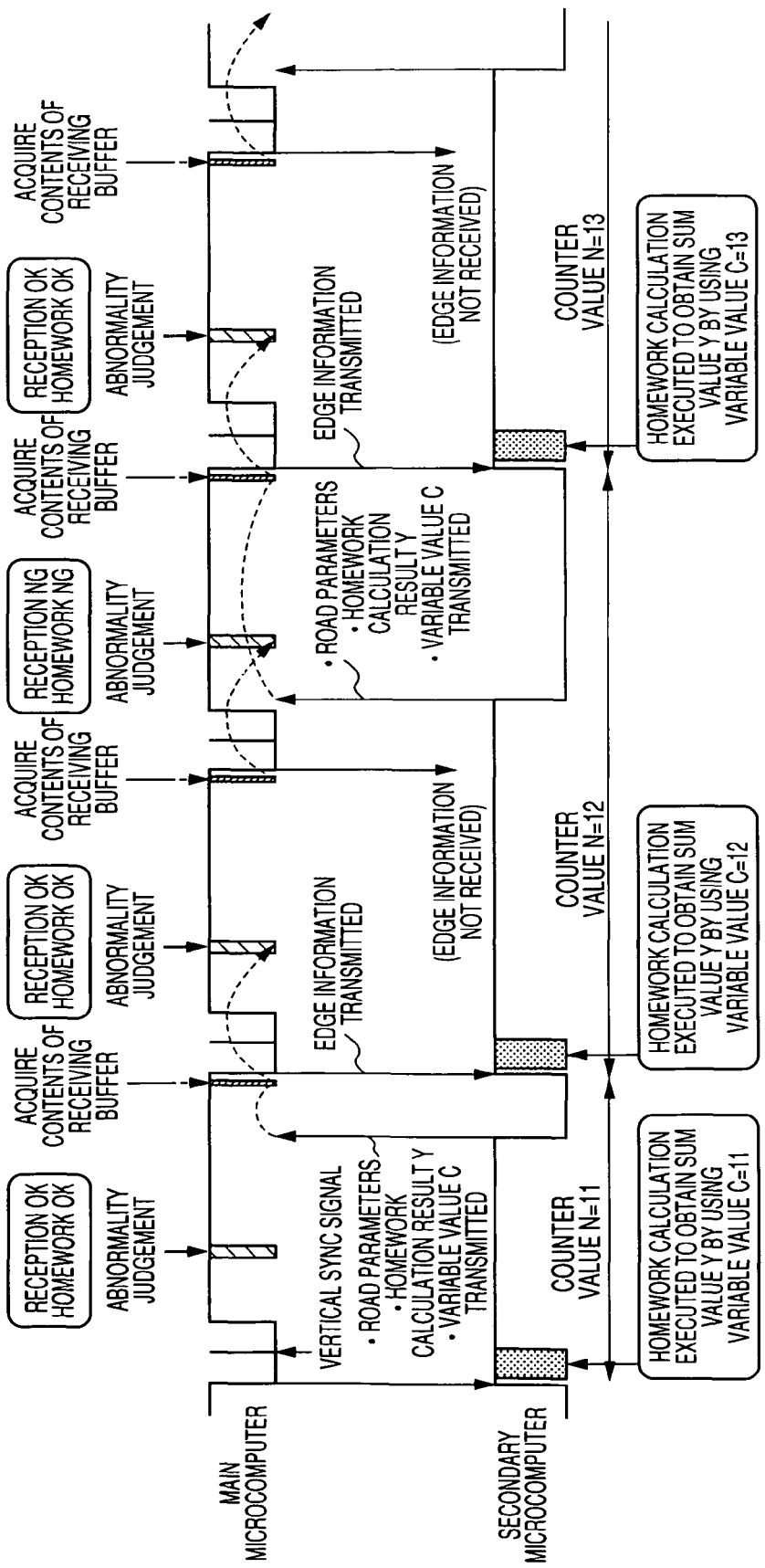
Figure 9:
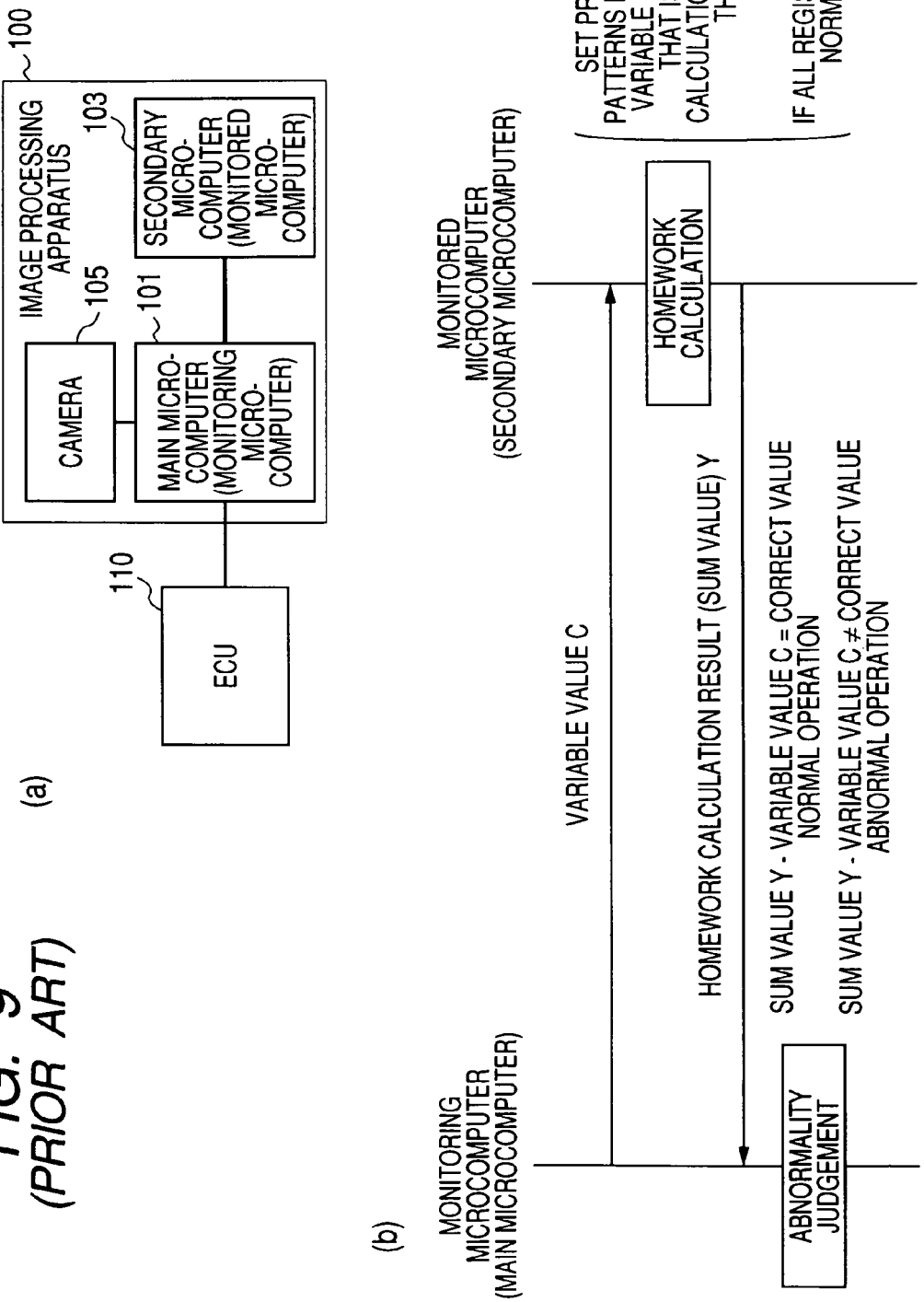
Figure 10:
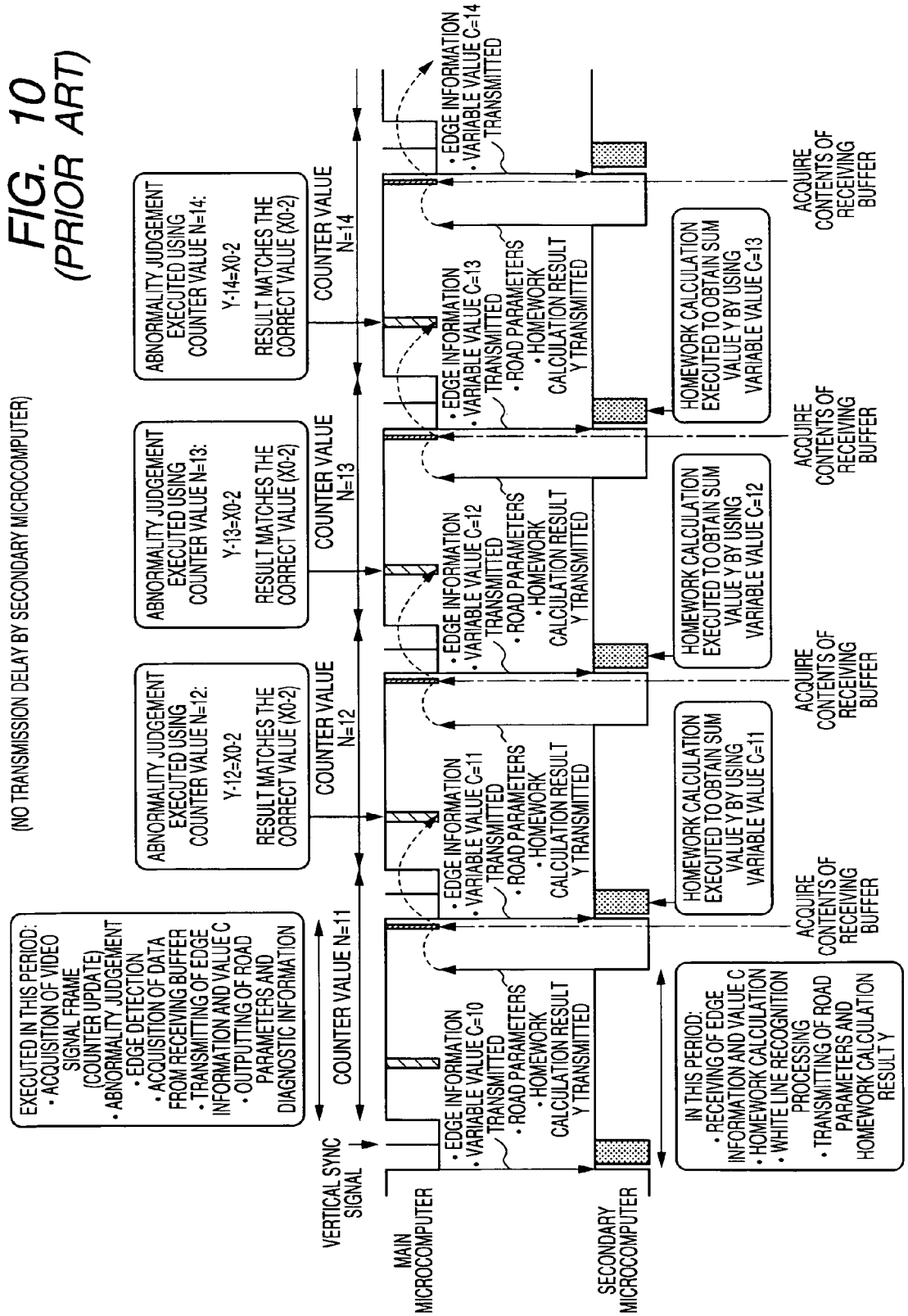
Figure 11:
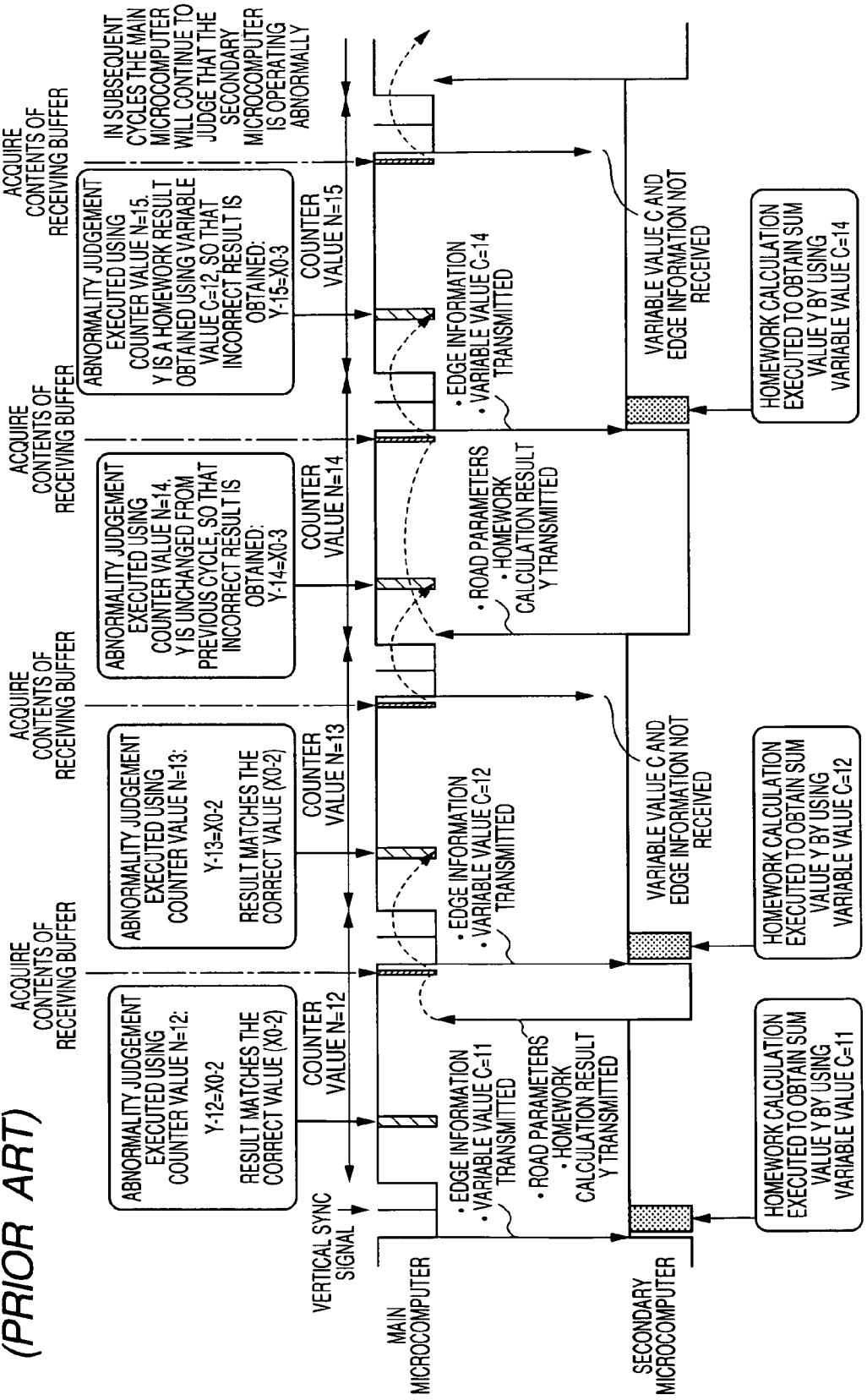

Diagram (a) of FIG. 4 is a flow diagram of a processing routine that is periodically executed by a main microcomputer and diagram (b) of FIG. 4 is a flow diagram of a processing routine that is periodically executed by a secondary microcomputer of the embodiment;

FIG. 5 is a diagram for illustrating timing relationships between respective processing operations of the main microcomputer and the secondary microcomputer;

FIG. 6 is a flow diagram of homework calculation processing that is executed by the secondary microcomputer;

FIG. 7 is a flow diagram of abnormal operation judgement processing that is executed by the main microcomputer;

FIG. 8 is a timing diagram illustrating communication between the main and secondary microcomputers, and abnormality judgement processing executed by the main microcomputer, under a condition in which there is a delay in transmitting information by the secondary microcomputer;

Diagrams (a) and (b) of FIG. 9 are diagrams for use in describing an example of a prior art type of image processing apparatus in which a main microcomputer monitors a secondary microcomputer to detect abnormal operation of the secondary microcomputer;

FIG. 10 is a timing diagram for describing processing for communication between the main and secondary microcomputers, and homework calculation processing, that are executed with the prior art example; and FIG. 11 is a timing diagram illustrating communication between the main and secondary microcomputers, and abnormality judgement processing executed by the main microcomputer, under a condition in which there is a delay in transmitting information by the secondary microcomputer with the prior art example.

DESCRIPTION OF PREFERRED EMBODIMENTS

Figure 1:
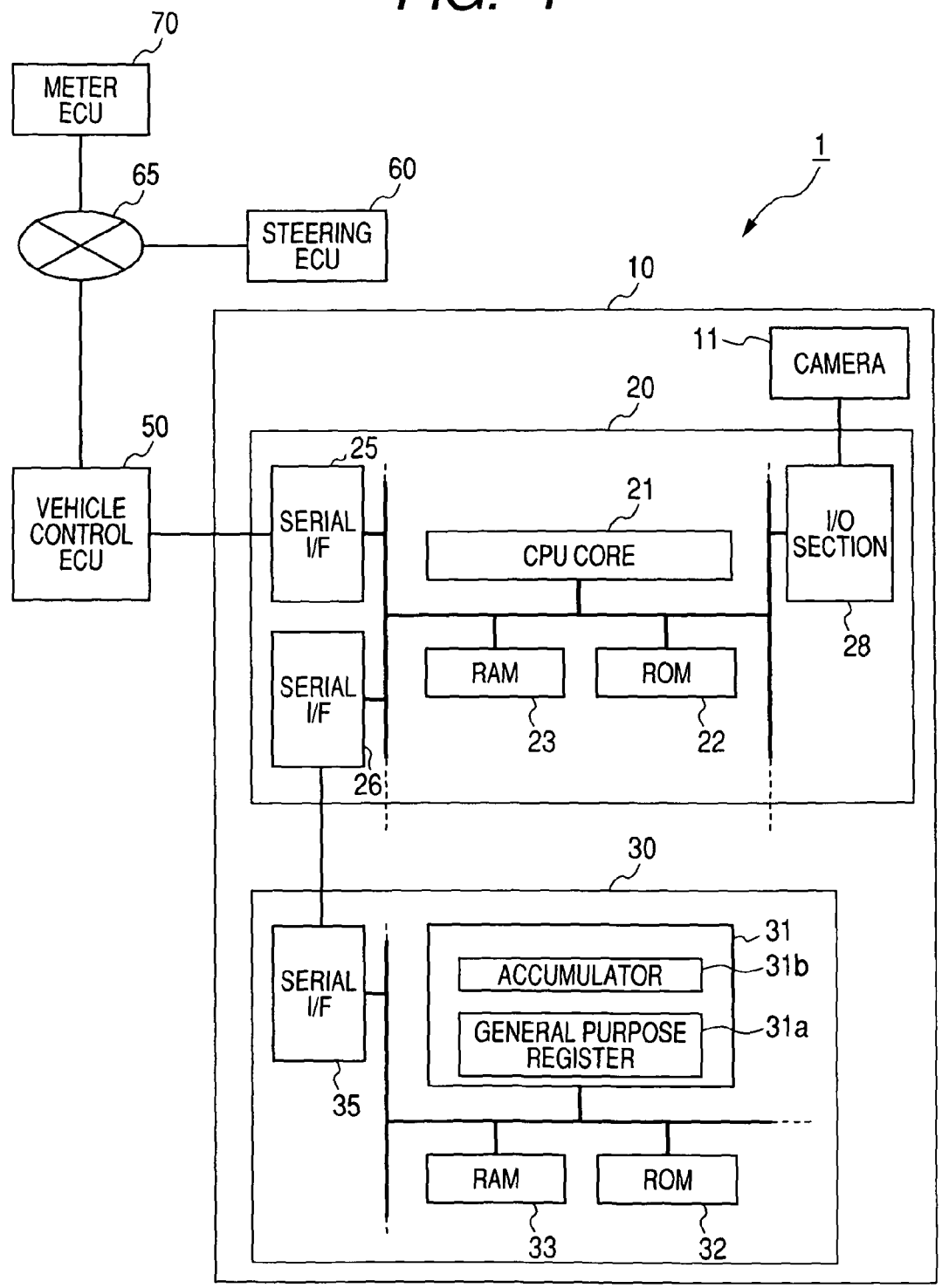
FIG. 1 is a block diagram of a lane-keeping system according to an embodiment of the invention.

FIG. 1 is a block diagram showing the configuration of an embodiment of a lane-keeping assistance (LKA) system 1. The lane-keeping assistance system 1 is designed to be installed in a motor vehicle, and serves to control the vehicle to follow a specific lane that is defined on a road upon which the vehicle is travelling. The lane-keeping assistance system 1 includes an image processing apparatus 10 which is equipped with a digital video camera 11 (referred to in the following simply as the camera 11), a vehicle control ECU (electronic control unit) 50 which is connected for serial communication with the image processing apparatus 10, a steering control ECU 60 which is connected for communication with the vehicle control ECU 50 via an in-vehicle LAN (local area network) such as a CAN (control area network), and a meter ECU 70 which is connected for communication with the vehicle control ECU 50 via the in-vehicle LAN.

The vehicle control ECU 50 generates steering control commands for causing the vehicle to follow a specific lane, based on road parameters that are inputted from the image processing apparatus 10, and supplies the steering control commands via the in-vehicle LAN to the steering control ECU 60. In addition, the vehicle control ECU 50 derives status information indicating whether the image processing apparatus 10 is operating normally or abnormally, based upon diagnostics information which is supplied from the image processing apparatus 10. The vehicle control ECU 50 transmits the status information via the in-vehicle LAN to the steering control ECU 60 and to the meter ECU 70.

In response to the steering control commands that are transmitted from the vehicle control ECU 50, the steering control ECU 60 controls the steering of the vehicle accordingly, to cause the vehicle to travel along the specified lane. More specifically, the steering control ECU 60 performs this steering control only so long as the status information that is transmitted from the vehicle control ECU 50 indicates that the image processing apparatus 10 is operating normally. If the status information indicates that the image processing apparatus 10 is operating abnormally, then the steering control ECU 60 halts the steering control, and the LKA function is terminated.

Based on the status information that is transmitted from the vehicle control ECU 50, the meter ECU 70 generates flashing of a warning lamp which is installed on a meter panel of the vehicle, when the image processing apparatus 10 is found to be operating abnormally, thereby notifying the vehicle driver of the abnormal condition.

In addition to the camera 11, the image processing apparatus 10 includes a pair of microcomputers 20 and 30, for processing image data that are supplied from the camera 11. The image processing is executed for recognizing lane markers which are formed on the road surface, and for determining the position relationship between the vehicle and the lane markers, to thereby calculate road parameters as described hereinafter. The road parameters are transmitted to the vehicle control ECU 50.

In the following, the microcomputer 20 (which is connected to the camera 11 and to the vehicle control ECU 50) will be referred to as the main microcomputer, and the microcomputer 30 (which is connected to the microcomputer 20) will be referred to as the secondary microcomputer. The intervals between successive vertical synchronizing signals of the video signal from the camera 11, i.e., in which data of successive video signal frames are respectively acquired and processed by the microcomputer 30, will be referred to as cycles.

The microcomputer 20 includes a CPU core 21 which is formed of a calculation circuit, registers which include a general-purpose register and an accumulator, a ROM (read-only memory) 22 for storing programs that are executed by the CPU core 21, a RAM 23 which is used in executing the programs, a serial interface 25 for performing serial communication with the vehicle control ECU 50, a serial interface 26 which is connected for serial communication with the microcomputer 30. The microcomputer 20 further includes an input/output section 28 which is connected to the camera 11 for receiving video data transmitted from the camera 11, and which transfers the video data to the interior of the microcomputer 20, and also transmits command signals from the CPU core 21 to the camera 11.

The microcomputer 20 further includes a RAM (random access memory) 33 which includes an image memory region, a transmitting buffer region, a receiving buffer region, and working memory regions, with these regions (memory areas) being defined beforehand. The image memory region is used for storing image data which are obtained from the camera 11, while the transmitting buffer region serves to store data that are to be transmitted to the vehicle control ECU 50 or to the microcomputer 30. The receiving buffer region is used as for temporary storage of data that are received from the vehicle control ECU 50 or from the microcomputer 30.

In the same way as for the microcomputer 20, the microcomputer 30 includes a CPU core 31 which is formed of a calculation circuit, registers which include a general-purpose register 31a and an accumulator 31b, etc., a ROM 32 for storing programs that are executed by the CPU core 31, a RAM 33 which is used in executing the programs, and a serial interface 35 for performing serial communication with the microcomputer 20. The microcomputer 30 performs various types of processing in accordance with programs stored in the ROM 32.

Figure 2:
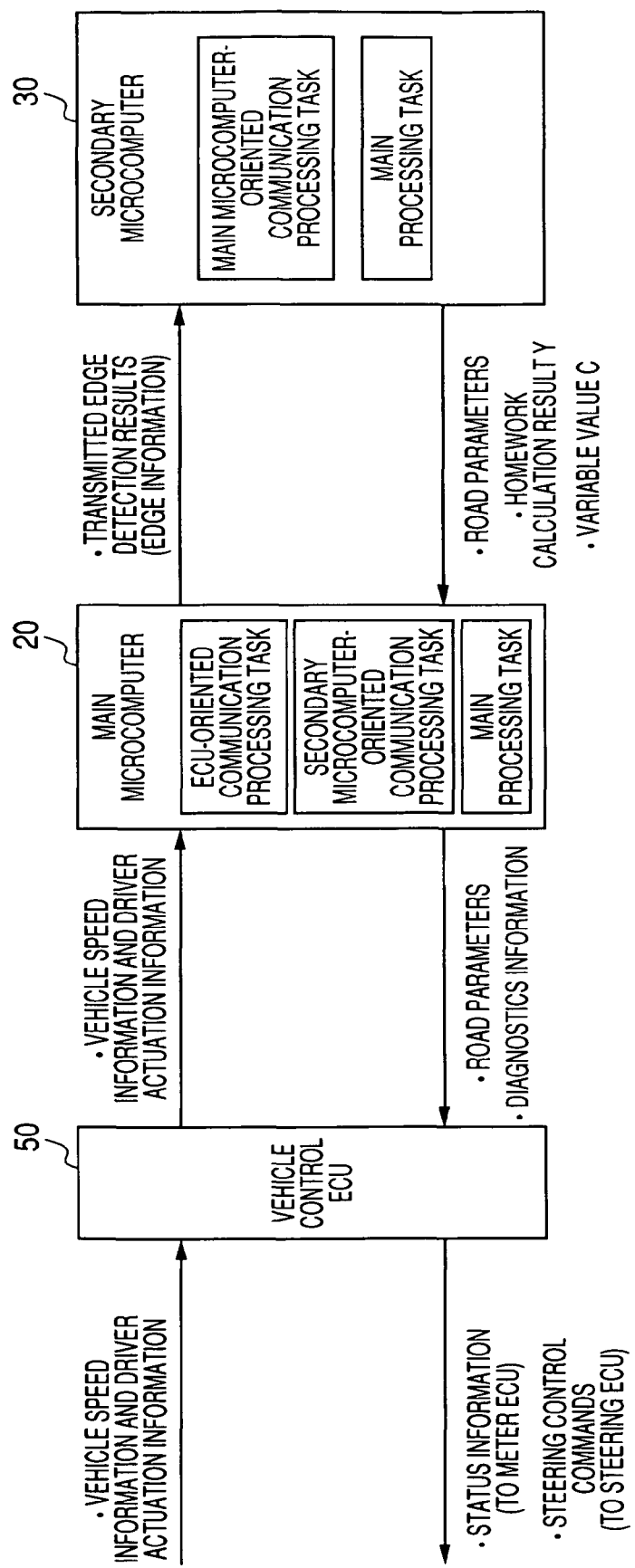
FIG. 2 is a diagram for use in describing various types of data that are transmitted and received between microcomputers of the embodiment.

FIG. 2 is a diagram for describing the types of data that are transmitted and received between the microcomputer 20 and the microcomputer 30. With the image processing apparatus 10 of this embodiment, the microcomputer 20 performs edge detection processing for detecting lane markers (which will be assumed to be white lines formed on the road surface) based on image data that are inputted from the camera 11, to thereby obtain edge information indicating positions of detected edges (e.g., edges of white lines) based on the edge detection results. The microcomputer 20 transmits the edge information to the microcomputer 30.

Based on the edge information received from the microcomputer 20, the microcomputer 30 executes white line recognition processing for recognizing the shape of lane markers that are located ahead of the vehicle on the road surface (i.e., white lines that appear in the images captured by the camera 11), and determines the position relationship between the vehicle and the lane markers. The microcomputer 30 thereby derives information expressing the road configuration and the position relationship between the vehicle and the road, as the road parameters, and transmits the obtained road parameters to the microcomputer 20.

Basically, the microcomputer 30 ascertains the characteristics of the lane along which the vehicle is currently travelling (this being referred to in the following as the "running lane" of the vehicle) by detecting the running lane as a region located between two lane markers, i.e., between two parallel white lines. The microcomputer 30 uses the information thus obtained concerning the running lane to determine the width of the road (designated as W in the following), which constitutes one of the road parameters. The microcomputer 30 also calculates the yaw angle θ between the direction along which the running lane extends and the direction in which the vehicle is currently travelling, and calculates the radius of curvature R of the running lane. The microcomputer 30 furthermore further calculates the amount of deviation (as an offset value δ) between the central position of the vehicle and the center of the running lane.

These road parameters W, R, θ and δ are transmitted to the microcomputer 20 as described above.

The road parameters are calculated periodically by the microcomputer 30, which also performs (periodically, with the same period as for the road parameters) a homework calculation processing procedure for enabling the microcomputer 20 to diagnose any abnormal operation of the microcomputer 30. Each homework calculation result Y is transmitted to the microcomputer 20 together with a variable value C which was used in performed that homework calculation, with Y and C being transmitted to the microcomputer 20 together with the most recently obtained set of road parameters.

When the microcomputer 20 receives a set of road parameters from the microcomputer 30, it transmits these to the vehicle control ECU 50 and also performs abnormality judgement processing to determine whether or not the microcomputer 30 is operating normally, based on the homework calculation result Y and the variable value C that are received together with the road parameters. The microcomputer 20 then transmits the results of the abnormality judgement, as diagnostics information, to the vehicle control ECU 50.

The image processing apparatus 10 is configured such that under a condition whereby the vehicle is travelling at high speed and the user has set the LKA function in operation (and only under this specific condition), the image processing apparatus 10 executes a main function of periodically calculating the road parameters and outputting these to the vehicle control ECU 50. In that condition, the microcomputer 20 of the image processing apparatus 10 receives externally supplied information which includes vehicle speed information and actuation information, with the actuation information being supplied via a user interface and indicating whether the LKA function is currently set on or off.

In parallel with executing the main function described above (the latter being referred to in the following as the "main processing task"), the microcomputer 20 is configured to execute an "ECU-oriented communication processing task" for communicating with the vehicle control ECU 50, and a "secondary microcomputer-oriented communication processing task" for communicating with the microcomputer 30. In the ECU-oriented communication processing task, the microcomputer 20 periodically transmits road parameters and diagnostics information to the vehicle control ECU 50, and also receives vehicle speed information and user actuation information from the vehicle control ECU 50. Based on these, the microcomputer 20 executes on/off control of the functions of the image processing apparatus 10.

Figure 3:
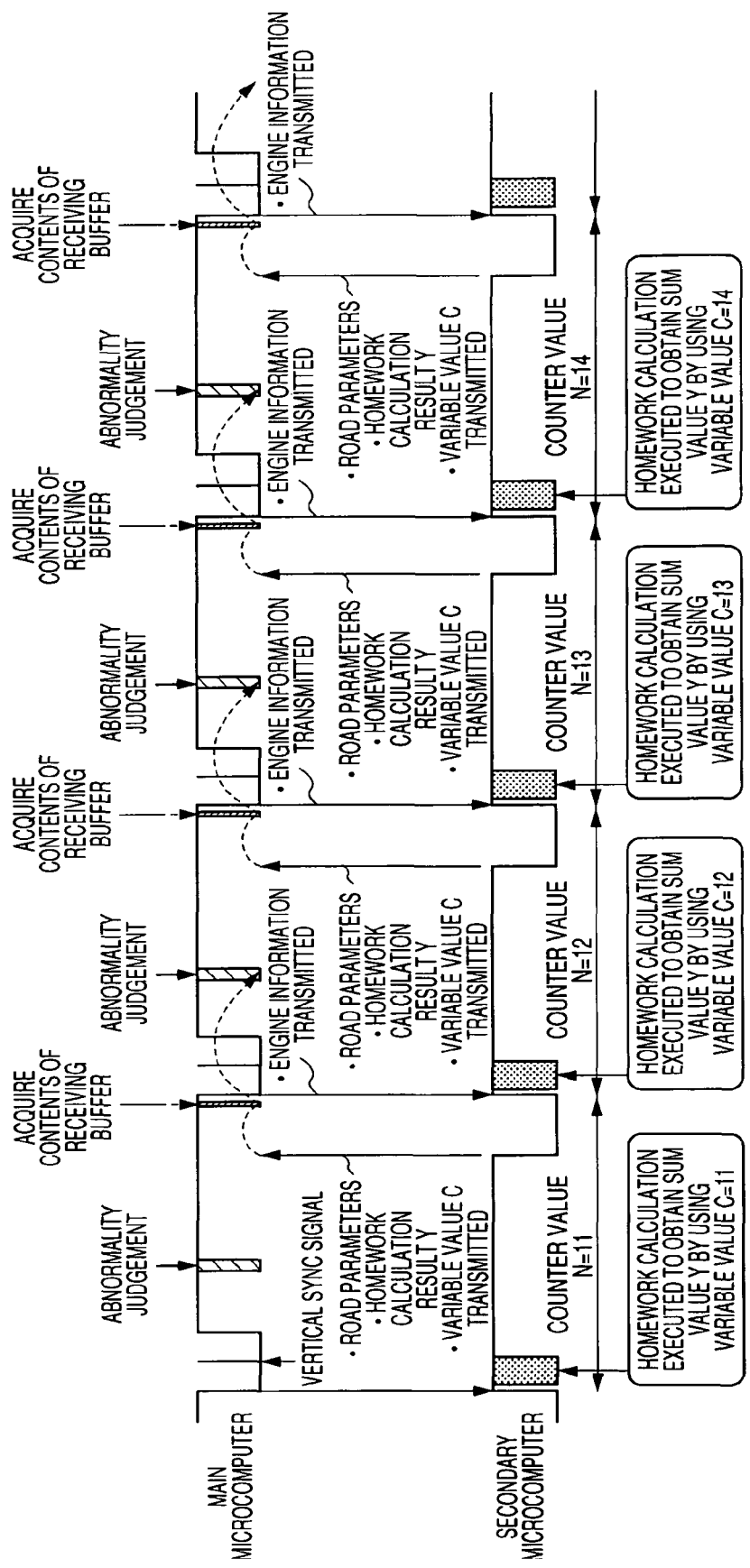
FIG. 3 is a timing diagram for describing processing for communication between microcomputers and homework calculation processing that are executed with the embodiment.

The main processing task is implemented by periodically executing the processing routine shown in the flow diagram of diagram (a) of FIG. 4, with the executions being timed in accordance with the vertical synchronizing signal of the video signal produced from the camera 11 as illustrated in the timing diagram of FIG. 3.

When execution of the main processing task processing begins, an image data acquisition operation is first performed (step S110). In this, a specific number of lines of image data (i.e., data expressing a specific number of horizontal scan lines of the most recent video signal frame) are obtained from the image data that are inputted from the camera 11, and stored in a video memory region of the RAM 23. This data is required in performing edge detection processing, in order to perform white line recognition processing, for detecting lane markers. Processing is then executed for judging whether abnormal operation of the microcomputer 30 is occurring (step S120). Details of this abnormality judgement processing are given hereinafter, referring to FIG. 7.

On completion of the abnormality judgement processing, the microcomputer 20 performs edge detection processing. In this, the aforementioned video data expressing a predetermined number of lines are is read out from memory and subjected to filter processing to detect the locations of any edges in the image expressed by the video signal. The resultant detection information is stored in the working region of the RAM 23, as edge information (step S130).

Although not specifically shown in the drawings, calculation processing is performed for adjusting parameters including the gain and shutter speed, etc., of the camera 11, prior to performing the edge detection processing.

On completion of the edge detection processing, the microcomputer 20 operates on the data which are currently held in the receiving buffer region, to write these received data into a receiving working region which is separate from the receiving buffer region, provided in the RAM 23 (step S140).

In doing this, the road parameters information and the information expressing a homework calculation result Y and variable value C, which have been transmitted from the microcomputer 30 when it executes a main microcomputer-oriented communication processing task and have been stored in the receiving buffer region, are read out from the receiving buffer region, and the information expressing Y and C is set as the data which will be subjected to abnormality judgement processing in the succeeding cycle. Also at this time, the road parameters information are read out from the receiving buffer region and are set as the transmission object data which are to be transmitted to the vehicle control ECU 50.

Next, the edge information obtained in step S150 is transmitted to the microcomputer 30, by execution of the secondary microcomputer-oriented communication processing task (step S150).

FIG. 5 is a diagram showing the time sequence of the processing contents that are executed by the microcomputers 20 and 30. As shown in FIG. 5, in parallel with executing the processing contents shown in diagram (a) of FIG. 4, the microcomputer 20 executes the ECU-oriented communication processing task for periodically communicating with the microcomputer 30 at timings in accordance with the aforementioned vertical synchronizing signals. When this occurs, the road parameters information obtained by the microcomputer 30 are transmitted by the microcomputer 20 to the vehicle control ECU 50, together with the results obtained from the abnormality judgement processing (i.e., diagnostics information).

As described for the microcomputer 20, the microcomputer 30 is configured to perform a main processing task for executing its main function, in parallel with executing a communication processing task (referred to in the following as the main microcomputer-oriented communication processing task) for communicating with the microcomputer 20. By executing the main microcomputer-oriented communication processing task, the microcomputer 30 detects when edge information has been received from the microcomputer 20. Each time such information reception is detected, the processing routine shown in the flow diagram (b) of FIG. 4 is executed by the microcomputer 30, as its main processing task. This processing routine is executed by the microcomputer 30 at successive timings, in accordance with reception of edge information from the microcomputer 20.

When such edge information is received, it is first stored in a receiving buffer region of the RAM 33 of the microcomputer 30.

In its main processing task, the microcomputer 30 first updates the count value N of a cycle counter in step S210 (N←N+1). The edge information most recently received from the microcomputer 20 is then acquired by being read out from the receiving buffer region of the RAM 33 (step S220).

The microcomputer 30 then executes the homework calculation processing shown in the flow diagram of FIG. 6 (step S230).

When the homework calculation processing is started, the microcomputer 30 attempts to set all of the bits of the general-purpose register 31a to the binary 1 state (all-ones pattern), then executes calculation processing for detecting whether any of these bits remain stuck in the 0 state (step S231), thereby obtaining a calculation result X. Specifically, an initial pattern of all-zeros is set as the value of X, and this is set into the general purpose register 31a. Some simple calculation processing operations involving that register are then performed. Following each of these calculation processing operations, if the result obtained is correct, then the value of X is incremented by one. In that way a condition whereby at least one of the bits of the general purpose register 31a is stuck in the 0 state can be diagnosed.

Various types of processing operation can be envisaged for detecting such a "stuck-bit" condition, and the invention is not limited to any specific form of such operation, so that detailed description is omitted herein.

On completion of step S231, the microcomputer 30 attempts to set all of the bits of the general purpose register 31a to the binary 0 state (all-zeros bit pattern) then executes calculation processing for detecting whether any of these bits remain stuck in the 1 state. The results obtained from this calculation processing are combined with the results obtained in step S231, to obtain an updated value of X (step S232). In the same way as for step S231, various simple processing operations are performed using the value set in the general purpose register 31a, and at the end of each of these processing operations, if a correct result has been obtained, the value of X is incremented by 1.

On completion of the processing of step S232, the microcomputer 30 attempts to set the accumulator 31b to an all-ones bit pattern, then executes calculation processing for detecting whether any of the accumulator bits remain stuck in the 0 state. The result obtained from this calculation processing is then combined with the value of X that was obtained in step S232, to obtained an updated value of X (step S234).

On completion of step S234, the microcomputer 30 attempts to set all of the bits of the accumulator 31B to an all-zeros bit pattern, then executes calculation processing for detecting whether any of these bits remain stuck in the 1 state. The results obtained from this calculation processing are then combined with the results obtained in step S234, to obtain a final value of X (step S235). The method of updating X is as described for steps S231, S232 and S234.

If the microcomputer 30 has executed each of the above calculation processing operations correctly, the final value of X will be a predetermined fixed value, designated as X(0).

On completion of step S235, the microcomputer 30 updates the counter value N, to obtain an updated value for the variable C, and adds this updated variable value C to the final value of X, to obtain a sum value Y (=X+C) as the homework calculation result (step S239). This execution of the homework calculation processing routine (S230 in diagram (b) of FIG. 4) is then ended.

Referring again to diagram (b) of FIG. 4, on completion of the homework calculation processing of step S230, the microcomputer 30 executes white line recognition processing based upon the edge information that has been received from the microcomputer 20, and thereby calculates the road parameters (step S240).

The microcomputer 30 then (in step S250) transmits these calculated road parameters to the microcomputer 20, together with information expressing the sum value Y that has been obtained in step S230 and the variable value C which was used in calculating that sum value Y (i.e., the variable value C which was set in step S237 of FIG. 6). This transmission is executed as the main microcomputer-oriented communication processing task.

Following completion of the processing sequence shown in diagram (b) of FIG. 4, that processing is subsequently again executed at the next occasion when edge information is received from the microcomputer 20.

In that way, each time the microcomputer 30 receives edge information, it executes homework calculation processing and white line recognition processing as illustrated in diagram (b) of FIG. 4 and in FIG. 5, and transmits the road parameters together with the homework calculation result Y and the corresponding variable value C to the microcomputer 20 when the white line recognition processing has been completed.

The abnormal operation judgement processing that is executed by the microcomputer 20 in step S120 of FIG. 4, based on the most recently received homework calculation result Y and variable value C from the microcomputer 30, will be described in the following. FIG. 7 is a flow diagram showing a processing routine that is executed by the microcomputer 20 periodically with a fixed period (i.e., with this embodiment, at the start of each cycle, as illustrated in the timing diagram of FIG. 8). When this processing begins, the microcomputer 20 first judges whether updated values of the homework calculation result Y and variable value C have been received from the microcomputer 30. Specifically, the microcomputer 20 judges whether the homework calculation result Y and variable value C which were used in abnormality judgement processing in the preceding cycle are respectively different from the values of Y and C that are currently set as the judgement object data.

If updated values for Y and C are found to have been received (YES in step S310), operation proceeds to step S340, while otherwise (No in step S310), operation proceeds to step S320.

In step S320, the microcomputer 20 increments a reception error counter value Er (Er←Er+1), then judges whether Er exceeds a predetermined threshold value Er0. If Er0 is found to be exceeded (YES in step S325) then a determination is made that the microcomputer 30 is operating abnormally (step S330), and this execution of the abnormality judgement processing routine is then ended.

However if the updated value of Er is judged to be less than the threshold value Er0 (NO in step S325) then step S360 is executed.

If step S340 is executed, the reception error counter value Er is reset to zero, and the subtraction value Z is then calculated (step S345) based on the currently received values of the homework calculation result Y and variable value C (i.e., which had been transferred from the receiving buffer region to the working region in RAM at the end of the preceding cycle, as described above). That is to say, the subtraction value Z (=Y−C) is calculated using the values of Y and C which were transmitted together from the microcomputer 30 in the preceding cycle, as can be understood from the timing diagram of FIG. 3.

The microcomputer 20 then judges (step S350) whether this calculated value of Z is the correct value (X0, as described above). The correct value X0 is determined by the design contents of steps S231 to S235, and cannot be obtained as the subtraction value Z if there is any bit in the general purpose register 31a or in the accumulator 31b that is stuck in the 1 or the 0 state.

If it is judged in step S350 that the subtraction value Z is not the correct value (X0), i.e., NO decision in step S350, operation proceeds to step S360 in which a homework calculation error counter Eh is incremented by one (Eh←Eh+1). A decision is then made (step S370) as to whether the updated value of Eh exceeds a predetermined threshold value Eh0. If the threshold value is exceeded (YES in step S370) then operation proceeds to step S380, in which the same processing is executed as in step S330, i.e., it is determined that there is abnormal operation of the microcomputer 30. This execution of the abnormality judgement processing routine is then ended.

However if it is judged that the updated value of Er does not exceed the threshold value E0 (NO in step S370), the microcomputer 20 determines that the microcomputer 30 is operating normally (step S395), and this execution of the abnormality judgement processing routine is then ended.

If it is judged that the subtraction value Z is the correct value Z0 (YES in step S350), then the error counter value Er is reset to zero (step S390), and the microcomputer 20 determines that the microcomputer 30 is operating normally (step S395). This execution of the abnormality judgement processing routine is then ended.

The judgement results obtained from this execution of the abnormality judgement processing routine are then transmitted to the vehicle control ECU 50 as diagnostics information, together with the currently derived road parameters, by execution of the ECU-oriented communication processing task.

With the LKA system 1 of this embodiment, if the microcomputer 30 of the image processing apparatus 10 executes processing without delay (as illustrated in the timing diagram of FIG. 3) then in each cycle, a homework calculation result Y and variable value C will be transmitted from the microcomputer 30 (together with the road parameters) to the microcomputer 20 prior to the point in that cycle at which the microcomputer 20 transfers the contents of the receiving buffer to the working region in RAM. That time point in each cycle will be referred to as the received data acquisition timing.

In each cycle, the microcomputer 20 judges whether new information have actually been received from the microcomputer 30 in the preceding cycle, by comparing the data currently read out from the receiving buffer region with the data read out in the preceding cycle. If these are different from one another, then this confirms that updated data were received from the microcomputer 30 during the preceding cycle, i.e., operation is proceeding normally, as illustrated in FIG. 3.

However if the microcomputer 30 requires an excessive amount of time to perform white line recognition processing, it will not be able to transmit information expressing the most recently derived homework calculation result Y and variable value C to the microcomputer 20 prior to the received data acquisition timing of the microcomputer 20 in the current cycle. In that case, the microcomputer 20 will not be able to acquire updated values for Y and C before performing the abnormality judgement processing in the succeeding cycle (so that a NO decision will be reached in the "data received ?" step of FIG. 7 when the abnormality judgement processing is executed). This condition is illustrated in the timing diagram of FIG. 8. In that example, in the second cycle, updated values of Y and C cannot be transmitted to the microcomputer 20 before the received data acquisition timing of the microcomputer 20 in that cycle. Hence when the microcomputer 20 performs the abnormality judgement processing routine of FIG. 7 during the third cycle, both the reception error counter Er and the homework calculation error counter Eh will be incremented by one.

In FIG. 8, the designation "received OK" at an execution of the abnormality judgement processing indicates that the reception error counter Er is Er is reset to 0 at the time of that processing, while "received NG" indicates that Er is incremented by 1 at that time. Similarly, the designation "homework OK" at an abnormality judgement processing indicates that the homework calculation error counter value Eh is reset to 0 at the time of that processing, while "homework NG" indicates that Eh is incremented by 1 at that time.

In the prior art, when such a communication delay by the microcomputer 30 occurs, the "homework NG" status will continuously occur in successive cycles, so long as the delay condition continues. Thus irrespective of whether or not there is an actual hardware failure (i.e., register failure) in the microcomputer 30, apart from the transmission delay, the homework calculation error counter value Eh will come to exceed the threshold value Eh0. Hence, an erroneous judgement result, indicating abnormal operation of the microcomputer 30, will be derived by the microcomputer 20.

However with the present invention, when the microcomputer 30 sets the value of the variable C and uses that in deriving a homework calculation result Y, the microcomputer 20 will subsequently obtain the subtraction value Z by subtracting from that homework calculation result Y the actual variable value C which was used in calculating the value of Y.

This is due to the fact that, with the present invention, these specific values of Y and C are received together, by the microcomputer 20. Hence the microcomputer 20 will always use the appropriate values for deriving the subtraction value Z, i.e., there is no possibility that an inappropriate value for the variable C will be used by the microcomputer 20, even if there is a delay in transmission by the microcomputer 30.

With the present invention, even if a transmission delay condition of the microcomputer 30 should continue over several successive cycles (i.e., a condition in which the microcomputer 30 does not transmit the road parameters and homework calculation result within the same cycle in which they are derived), it can be ensured that the maximum value E0 of the error count will not be exceeded. In the specific example of FIG. 8, the transmission delay extends into the succeeding cycle (with this being referred to as a 1-cycle transmission delay in the following). In that case, so long as this delay condition continues, each of reception error counter Er and the homework calculation error counter Eh will be alternately incremented by one ("reception NG, homework NG"), then reset to zero ("reception OK., homework OK"), in successive cycles.

Thus in this case, each of the count values attained by the reception error counter Er and the homework calculation error counter Eh will not exceed 1, other than when there is an actual hardware abnormality of the microcomputer 30 or an interruption of communication with the microcomputer 30. Neither of Eh or Er will exceed a count of 1 simply as a result of a 1-cycle transmission delay by the microcomputer 30. Similarly if the maximum duration of transmission delay is longer, e.g., 2-cycle transmission delay, neither of the counters Eh and Er will exceed a value of 2, during normal operation.

Hence, the error count threshold values Er0 and Eh0 are each set to an appropriate value (e.g., in the range 5 to 10) which is determined based on the anticipated maximum number of cycles for which a transmission from the microcomputer 30 may be expected to be delayed. It can thereby be reliably ensured that the microcomputer 30 will not be erroneously judged to have a malfunction when transmission delays by the microcomputer 30 occur. In that way it can be ensured that the microcomputer 20 will accurately detect abnormal operation of the microcomputer 30, irrespective of transmission delays which may occur as a result of the processing executed by the microcomputer 30 as its main task.

The constituents of the above embodiment correspond to respective elements of the appended claims as follows. The image processing apparatus 10 corresponds to an electronic apparatus, the microcomputer 30 corresponds to a first microcomputer, the microcomputer 20 corresponds to a second microcomputer, the processing of steps S231 to S235 in the flow diagram of FIG. 6 corresponds to a first calculation procedure, and the processing of steps S231 to S235 in FIG. 6 corresponds to a second calculation procedure. The processing of step S250 of diagram (b) of FIG. 4 corresponds to a transmission procedure, the processing of step S345 of FIG. 7 corresponds to a subtraction procedure, and the processing of step S350 of FIG. 7 corresponds to a judgement procedure. The operation whereby the microcomputer 20 transmits diagnostics information corresponds to an operation whereby the second microcomputer notifies an external apparatus of abnormal operation of the first microcomputer.

It should be noted that the present invention is not limited to the above embodiment, and that various modifications to that embodiment could be envisaged. Furthermore, although the above embodiment has been described as applied to an image processing apparatus 10, it would be possible to apply the concepts of the invention to various other types of electronic apparatus which incorporate a plurality of microcomputers that are connected for communication with one another.

What is claimed is:

1. An electronic apparatus comprising a first microcomputer and a second microcomputer coupled for communication with one another, wherein said first microcomputer is configured to repetitively execute a first calculation procedure of successively setting predetermined bit patterns in respective registers of a CPU (central processing unit) core of said first microcomputer and executing predetermined calculation processing which utilizes said registers, said bit patterns and calculations being predetermined such that a specific fixed value is obtained as a final result from said calculations when each of said registers are functioning normally, a second calculation procedure of updating a variable value and adding said final result to said updated variable value, to obtain a sum value, and a transmission procedure of transmitting information expressing said sum value, and information expressing said variable value which was utilized in calculating said sum value, to said second microcomputer;

and wherein said second microcomputer is configured to execute a subtraction procedure of operating on said information expressing said sum value and said variable value, for subtracting said variable value from said sum value to thereby obtain a subtraction value, and a judgement procedure of judging whether or not said subtraction value is identical to said specific fixed value, and determining whether or not abnormal operation of said first microcomputer is occurring, based on results of said judgement.

2. An electronic apparatus according to claim 1, wherein said second microcomputer is configured to transmit notification of abnormal operation of said second microcomputer to an external apparatus, when said abnormal operation is detected by said judgement procedure.

3. An electronic apparatus according to claim 1, wherein:
said first microcomputer and said second microcomputer are respectively configured to periodically exchange information relating to a main function of said electronic apparatus, for operating in cooperation to execute said main function, and wherein each of said first homework calculation procedure, said second homework calculation procedure, said transmission procedure and said judgement procedure are executed periodically; and
said first microcomputer is configured to transmit currently derived information relating to said main function to said second microcomputer together with information expressing currently obtained ones of said sum value and said variable value.

4. An electronic apparatus according to claim 3, wherein said second microcomputer transmits information relating to said main function to said first microcomputer at each of a first series of time points having a fixed repetition period, and wherein said first microcomputer transmits said currently derived information relating to the main function and said information expressing said currently obtained sum value and variable value to said second microcomputer at each of a second series of time points, which are not synchronized with said first series of time points.

5. An electronic apparatus according to claim 4, wherein said first series of time points are synchronized with frame periods of a video signal, and in each of said frame periods:
said second microcomputer transmits data relating to said main function to said first microcomputer;
said first microcomputer thereafter derives currently obtained ones of said sum value and said variable value and executes processing relating to said main function based on said data received from said second microcomputer, and
on completion of said processing relating to the main function, said first microcomputer transmits information expressing said currently obtained sum value and variable value to said second microcomputer together with information expressing results of said processing relating to the main function.

6. A method of judging occurrence of abnormal operation of a first microcomputer of an electronic apparatus which comprises said first microcomputer and a second microcomputer, the method comprising:
controlling said first microcomputer to periodically update a variable value,
execute predetermined calculation processing to obtain a final calculation result, said calculation processing being predetermined to produce a specific fixed value as said final calculation result when said first microcomputer is functioning normally,
add said variable value to said final calculation result to obtain a sum value, and
concurrently transmit said sum value and said variable value to said second microcomputer;
and controlling said second microcomputer to respond to each occurrence of receiving a sum value and variable value transmitted from said first microcomputer, by
subtracting said received variable value from said received sum value to obtain a subtraction value,
comparing said subtraction value with said predetermined fixed value,
incrementing an error count value when said subtraction value differs from said predetermined fixed value, and resetting said error count value when said subtraction value is identical to said predetermined fixed value,
comparing said error count value with a predetermined maximum value, and
determining that abnormal operation of said first microcomputer is occurring, when said error count value is judged to exceed said maximum value.

7. A method of judging occurrence of abnormal operation of a first microcomputer of an electronic apparatus in which a second microcomputer periodically transmits respective data sets relating to a main function of said electronic apparatus to said first microcomputer and in which first microcomputer processes each received one of said data sets to obtain a corresponding set of processed data relating to said main function and transmits each said set of processed data to said second microcomputer upon completion of said processing, the method comprising:
controlling said first microcomputer to respond to a currently received data set that has been transmitted from said second microcomputer, by
executing said processing relating to the main function on said received data set,
updating a variable value,
executing calculation processing to obtain a final calculation result, said calculation processing being predetermined to produce a specific fixed value as said final calculation result when said first microcomputer is functioning normally,
adding said updated variable value to said final calculation result to obtain a sum value, and
concurrently transmitting said sum value and said updated variable value to said second microcomputer, together with transmitting a set of processed data corresponding to said currently received data set;
and controlling said second microcomputer to respond to receiving said sum value and variable value transmitted from said first microcomputer, by
subtracting said received variable value from said received sum value to obtain a subtraction value,
comparing said subtraction value with said predetermined fixed value,
incrementing an error count value when said subtraction value differs from said predetermined fixed value, and resetting said error count value when said subtraction value is identical to said predetermined fixed value,
comparing said error count value with a predetermined maximum value, and
determining that abnormal operation of said first microcomputer is occurring, when said error count value is judged to exceed said maximum value.

\* \* \* \* \*